United States Patent [19]
Bailey

[11] Patent Number: 5,786,922
[45] Date of Patent: Jul. 28, 1998

[54] DUAL SIGNAL SUBHARMONIC CARRIER FOR SYSTEMS WITH UNKNOWN DELAY

[75] Inventor: David A. Bailey, Glendale, Ariz.

[73] Assignee: Honeywell Inc.

[21] Appl. No.: 601,413

[22] Filed: Feb. 15, 1996

[51] Int. Cl.$^6$ ................................................ H04B 10/00
[52] U.S. Cl. ............... 359/158; 359/110; 364/571.01; 324/202; 324/601; 250/227.12
[58] Field of Search ................... 359/110, 133, 359/140, 158; 324/74, 130, 201–202, 601; 250/227.12; 364/571.01; 370/491

[56] References Cited

U.S. PATENT DOCUMENTS

| | | | |
|---|---|---|---|
| 4,419,622 | 12/1983 | Cuneo, Jr. et al. | 324/601 |
| 5,062,703 | 11/1991 | Wong et al. | 356/73.1 |
| 5,177,488 | 1/1993 | Wang et al. | 250/227.12 |

*Primary Examiner*—Kinfe-Michael Negash
*Attorney, Agent, or Firm*—Charles J. Ungemach

[57] ABSTRACT

A system used with a system having a carrier delay to determine the phase of a signal before the delay and to recover the signal after the delay. Two signals at different frequencies are sent through the system having a carrier delay. One signal will be the signal that contains the phase information. The other signal is a reference signal to generate a reference for the first signal.

5 Claims, 4 Drawing Sheets

DUAL SIGNAL SUBHARMONIC CARRIER FOR SYSTEMS WITH UNKNOWN DELAY

BACKGROUND OF THE INVENTION

1. Field of the Invention

The present invention relates to determining optimal transmission in an optical delay line.

2. Description of the Prior Art

Optical delay lines are used to transfer data for communication. Data is stored in light beams that travel through the optical lines. FIG. 1 shows a six bit optical delay line 1 with seven Directional Coupler Switches 2 and six delays 4 is shown. When light comes into a switch 2 in the delay line 1, the light could possibly go through to the next switch 2 (the lower branch) or switch from the optical line 1 to a delay 4 (in the upper branch.) The switches 2 are analog devices in which two sets of electrodes (not shown) exist for each switch and are operable for switching or not switching light so that it travels through a predetermined number of delays 4. If switching is desired, then a voltage is applied to the electrodes (not shown.)

During switching, some light is lost. This is referred to as leakage. The amount of leakage that occurs is measured at the end of the optical line 1 where there are two outputs: a monitor output 6 and a data output 7. The monitor output 6 sees the amount of leakage that has occurred and the data output secures the signal for transmissions to apparatus such as antenna. It is desirable to minimize output at the monitor output 6 so as little leakage as possible occurs.

It has been found that the amount of leakage at the monitor output 6 varies with the voltage applied to the switches 2 as in FIG. 2 which shows a curve 10 representation of the light at the monitor output 6 plotted against the voltage applied to the switches 2. It is seen that with increasing the voltage the amount of light follows through an area "a" to a low point at area 11 and then increasing up through an area "b". Since the output at the monitor output 6 is the amount of leakage, it is desirable to have the monitor output 6 as low as possible i.e. in the region 11 of the curve 10. As shown on the graph, increasing the voltage at position "b" increases the output at the monitor output and increases in leakage. Increasing the voltage at position "a" would decrease the output at the monitor output and decreases the leakage. In order to determine whether the delay line is operating at a point in region "a" or a point in region "b", a search frequency signal has heretofore been introduced into the optical delay line 1 and demodulated to produce an additional output. The sign of the additional output indicated if the voltage was at point "a" or point "b" so that it could be known whether to increase the voltage or decrease the voltage to reduce the leakage. Calibration of a delay line is performed by applying the appropriate voltage to reduce the leakage.

Unfortunately, with an unknown delay, the additional output may be phase shifted so as to make it difficult to determine the sign of the additional output and thus one could not always be sure whether the monitor output is at point "a" or point "b" on the signal.

SUMMARY OF THE INVENTION

The present invention is a system for determining whether the monitor output is on the falling or rising point of the output curve by producing information to calibrate optical delay lines. The present system introduces two signals at differing frequencies. One of the signals contains information to calibrate the optical delay line. The other signal is a reference signal to prevent the first signal's information from being indeterminable. Two demodulators are used, a first of which receives one of the signals and a second of which receives the second signal. The second demodulator acts as a phase detector in a phase locked loop wherein the output of the second demodulator goes to a Voltage Controlled Oscillator (VCO) in which the VCO has two outputs with one output going back to the second demodulator to form the phase locked loop. The other output of the VCO goes to the first demodulator in which the output of the first demodulator provides information to calibrate the optical delay line.

DETAILED DESCRIPTION OF THE PRESENT INVENTION

Figure 2:
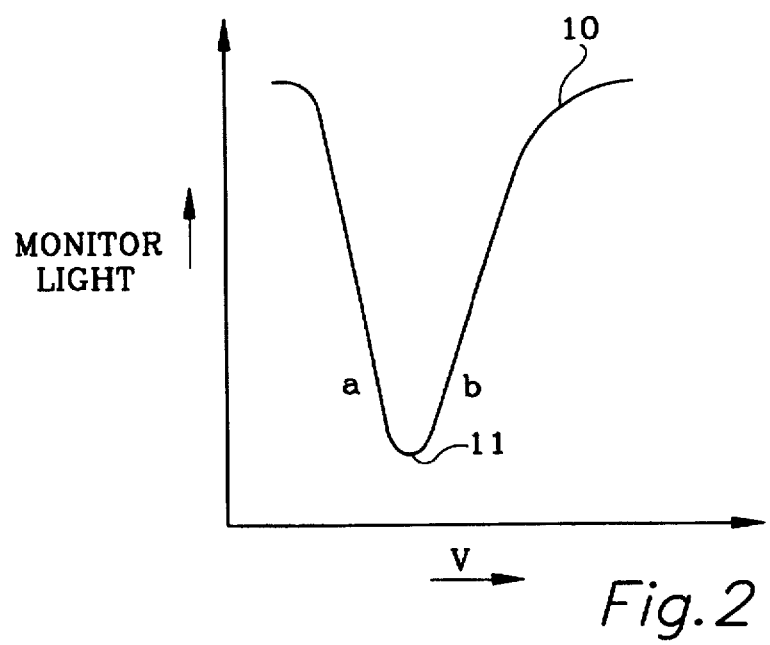
FIG. 2 shows a graph of the monitor output in relation to switch voltage.
Figure 3:
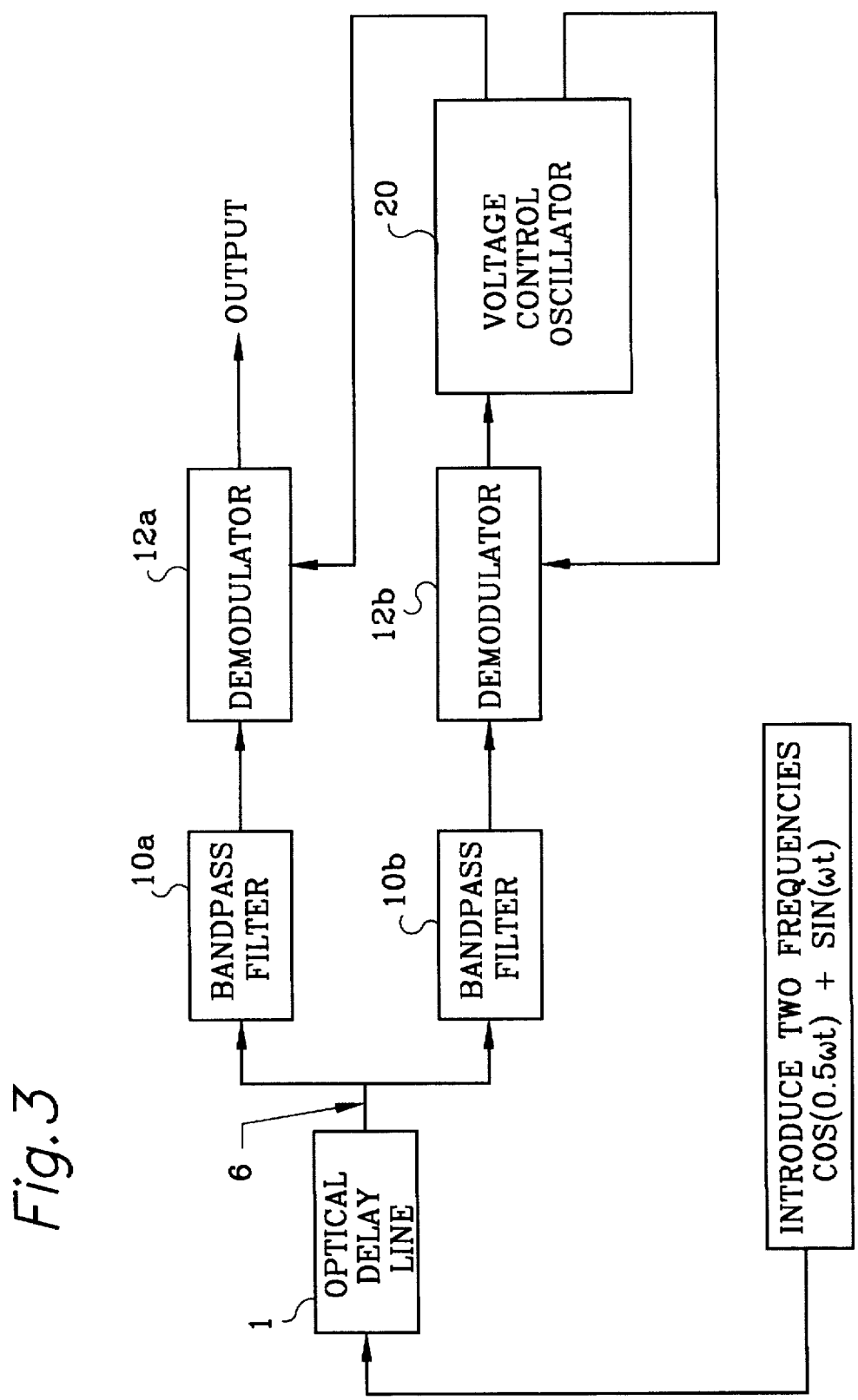
FIG. 3 shows a block diagram of the present embodiment of a dual subharmonic carrier for systems with an unknown delay.

FIG. 3 is a block diagram of the present invention. In the present invention a signal generator introduces two frequencies into the optical delay line 1: a search frequency signal, $\sin(\omega t)$, and a subharmonic frequency signal, $\cos(0.5\,\omega t)$. As mentioned above, the sign of the demodulated search frequency signal indicates if the monitor output is at point "a" or point "b" in the graph in FIG. 2. This information is useful to calibrate the optical delay line and reduce the monitor output and thus, reduce the leakage. However, with an unknown delay, it is very difficult to determine the calibration information. Therefore, the subharmonic frequency signal $\cos(0.5\,\omega t)$ is used as a reference signal for the search frequency signal $\sin(\omega t)$ so that the calibration information can be more easily determined.

Figure 1:
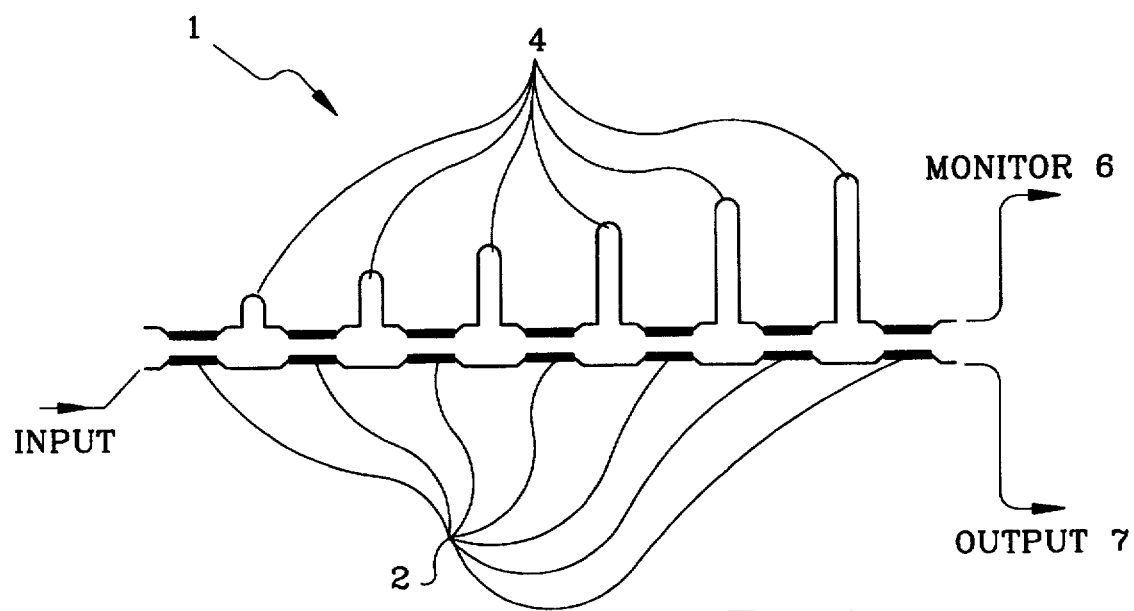
FIG. 1 shows a 6 bit optical line with 6 delays and 7 switches.

As stated before, an optical delay line 1 has two outputs 6 and 7 as shown in FIG. 1. The output at the monitor output 6 indicates the leakage in the optical delay line 1 and is the output the present invention detects to determine calibration information. The monitor output 6 from the optical delay line 1 is fed into two separate bandpass filters 10a and 10b. Filter 10a a is tuned to pass $\sin(\omega t)$ and the other filter 10b is tuned to pass $\cos(0.5\,\omega t)$ to separate the respective frequencies. The outputs of filters 10a and 10b are then sent to demodulators 12a and 12b respectively for demodulation. The search frequency signal $\sin(\omega t)$ enters demodulator 12a and the subharmonic frequency $\cos(0.5\,\omega t)$ signal enters demodulator 12b.

The subharmonic frequency signal enters a phase locked loop consisting of the subharmonic frequency demodulator 12b and a VCO (Voltage Control Oscillator) 20. The VCO 20 has two outputs. A first output is sent back to the subharmonic frequency demodulator 12b which acts as a phase detector to create the phased locked loop. The second output is sent to the search frequency demodulator 12a. The second output and the search frequency signal are then demodulated to provide a resultant output. As mentioned above, if the output is positive, the voltage is at point "b" on the curve 10 in FIG. 2 and if the output is negative, the voltage is at point "a" on the curve 10 in FIG. 2.

Figure 4:
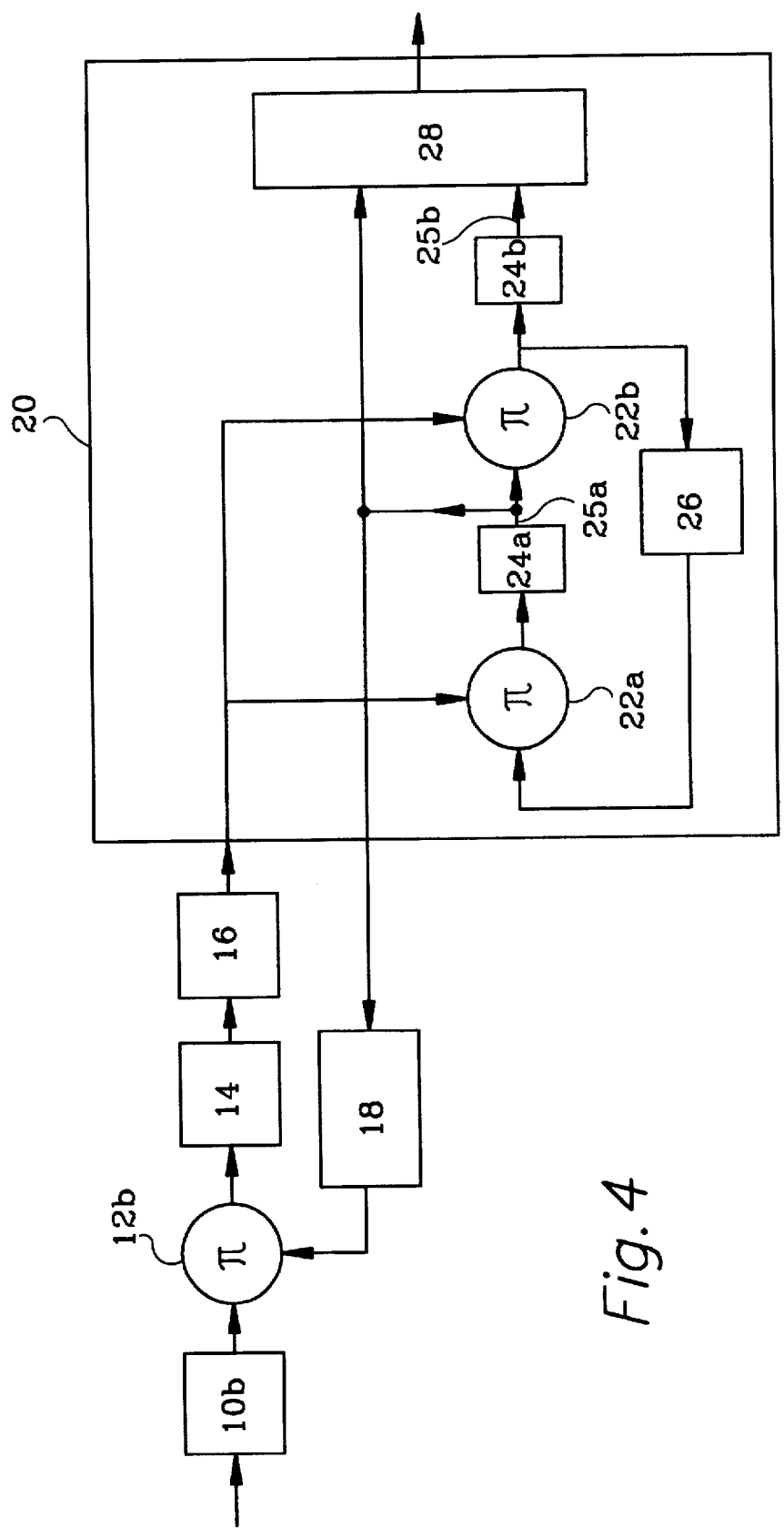
FIG. 4 shows a phase locked loop of the subharmonic frequency signal.

FIG. 4 depicts a more detailed diagram of the phase locked loop. The signal from the subharmonic frequency demodulator 12b, the signal is sent to a low pass filter 14 to filter out noise. After the low pass filter 14, an integrator and compensation means 16 is used for frequency compensation to stabilize the signal for the phase locked loop. The signal is then sent to the VCO 20.

The output from the integration and compensation means 16 becomes two signals for the VCO 20. The first signal is input to a multiplier 22a and multiplied with the gain 26 of the second signal. The output of the multiplier 22a is integrated by a frequency integrator 24a to create a first output 25a. This output 25a is sent back to the demodulator 12b through a pulse generator 18 which determines the gain. The gain of this first output 25a is multiplied with the subharmonic frequency signal coming from the bandpass filter 12b to keep the signal from shifting in phase. The output from the integration and compensation means 16 is also sent to a second multiplier 22b, as a second signal, in the VCO 20 which is multiplied with the first output 25a. The output of the second multiplier 22b is integrated by a frequency integrator 24b and becomes a second output 25b which is sent to a frequency doubler 28. The output from the frequency doubler 28 will be used as a reference signal for the search frequency signal.

The frequency doubler 28 doubles the frequency so that later the subharmonic frequency signal can demodulate the search frequency signal. The frequency doubler 28 may, for example, be a not exclusive or (XOR) logic element. The frequency doubler 28 finds the not exclusive or of the first output 25a and the second output 25b. The output of the frequency doubler 28 is a square wave at a frequency ωt which is the same frequency as the as the search frequency signal, and this output is sent to the search frequency demodulator 12a as seen in FIG. 3. The sign of the output of the search frequency demodulator 12a will indicate at what point the monitor output 6 is at in FIG. 2 and whether the voltage needs to be increased or decreased to reduce the monitor output 6 and reduce leakage.

FIG. 5 shows the various signals when the monitor output has a voltage at area "b" of FIG. 2. Looking at FIGS. 3, 4 and 5 together, the signals at various points within the system of the present invention are shown. FIG. 5a and 5b show waveforms after the separation filters 10a and 10b (see FIG. 3). FIG. 5c is the output out of the subharmonic frequency phase detector 12b before filtering by the low pass filter 14 (see FIG. 4). FIG. 5d is the gain of the waveform in FIG. 5e which is the first output 25a from the VCO 20 that completes the phase locked loop (see FIG. 4). The waveform in FIG. 5f is the second output 25b (see FIG. 4). The waveform in FIG. 5g is the "not exclusive or" of the waveforms in FIGS. 5e and 5f (see FIG. 4).

Figure 5A:
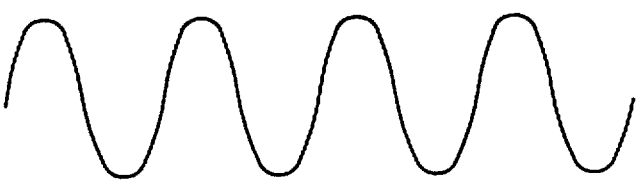
FIGS. 5a–5b show the two frequency signals after passing through their respective filters.
Figure 5B:
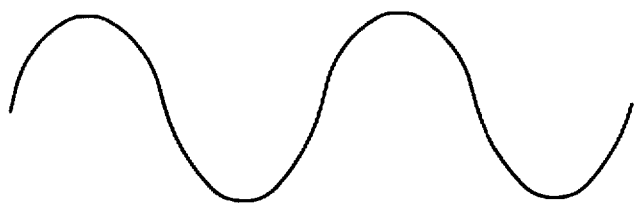
Figure 5C:
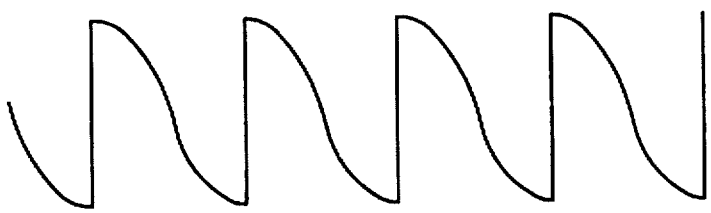
FIGS. 5c–5g show the signals involved in the phase locked loop.
Figure 5D:
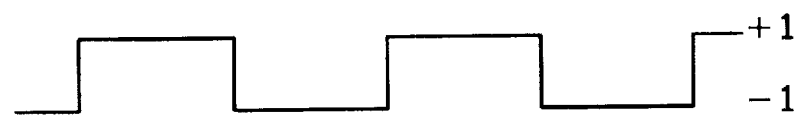
Figure 5E:
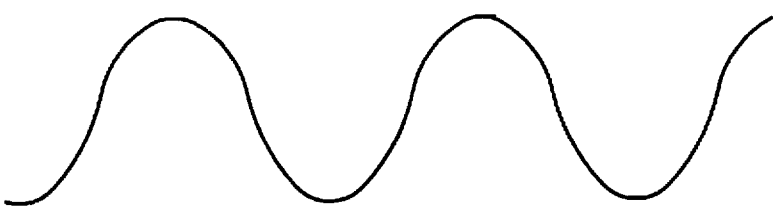
Figure 5F:
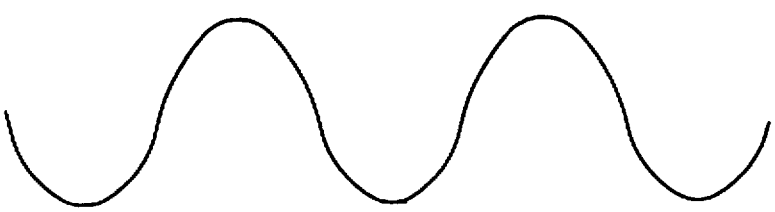
Figure 5G:
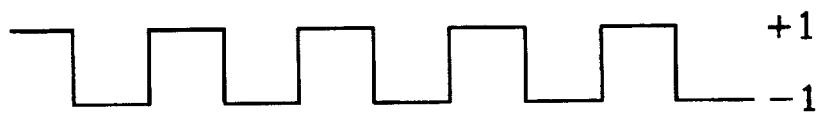
Figure 5H:
FIG. 5h shows the signal at the output of the system.

Again, the waveform in FIG. 5a is the search frequency signal after the separation filter 10a (see FIG. 3). The waveform in FIG. 5g is from the VCO 20 and used to demodulate the waveform in FIG. 5a with demodulator 12a (see FIG. 3). The waveform in FIG. 5h is the waveform resulting from the demodulation and the output of the system of the present invention (see FIG. 3). The output is positive when the system 30 is operating on the "b" side in the graph of FIG. 2. The output would be negative if the system 30 were operating on the "a" side in the graph of FIG. 2. Once this information is determined, the optical delay line 1 can be calibrated by applying an appropriate voltage to the monitor output 6 according to the graph in FIG. 2 and thus, decrease the leakage and improve operation of the optical delay line 1.

The embodiments of the invention in which an exclusive property or right is claimed are defined as follows:

1. A system for obtaining calibration information for an optical communication means comprising:

optical communications means;

signal generating apparatus, connected to the optical communication means, generating two signals into the optical communication means in which a first signal at a first frequency and a second signal at a second frequency are produced means operable to demodulate the first signal so that it contains calibration information and the second signal is a reference signal for the first signal.

2. The system of claim 1 wherein the first frequency is half of the second frequency.

3. A system for obtaining calibration information for an optical communication means comprising:

optical communication means;

signal generating apparatus generating a first signal at a first frequency and a second signal at a second frequency which are input into the optical communication means;

a first demodulator receiving the first signal from the optical communications means and a second demodulator receiving the second signal from the optical communication means;

control means, connected to the first demodulator and the second demodulator, for stabilizing the second signal from the second demodulator and for creating an input to the first demodulator to provide calibration information for the optical communication means.

4. The system of claim 3 wherein the first frequency is half of the second frequency.

5. The system of claim 3 wherein a phase locked loop is created between the second demodulator and the control means.

* * * * *